United States Patent [19]
Szabo

[11] 4,050,583
[45] Sept. 27, 1977

[54] BICYCLE STAND

[76] Inventor: Michael V. Szabo, 109 N. Washington, Oxford, Mich. 48051

[21] Appl. No.: 622,028

[22] Filed: Oct. 14, 1975

[51] Int. Cl.² .............................................. A47F 7/00
[52] U.S. Cl. ...................................... 211/20; 70/234; 211/5
[58] Field of Search ................... 211/5, 4, 7, 8, 17–24; 280/179 A, 293, 297; 105/368 R; 70/233–235; 248/119 R, 203

[56] References Cited
U.S. PATENT DOCUMENTS

| 631,665 | 8/1899 | Potter | 211/5 |
| 3,581,962 | 6/1971 | Osborn | 211/22 |
| 3,599,798 | 8/1971 | Osborn | 211/24 |
| 3,881,680 | 5/1975 | Lietart | 70/234 X |

FOREIGN PATENT DOCUMENTS

| 88,377 | 1/1937 | Sweden | 211/22 |
| 20,828 of | 1893 | United Kingdom | 211/20 |
| 804,469 | 11/1958 | United Kingdom | 211/17 |

Primary Examiner—Roy D. Frazier
Assistant Examiner—Terrell P. Lewis
Attorney, Agent, or Firm—Walter Potoroka, Sr.

[57] ABSTRACT

A bicycle stand separate from the bicycle that may be formed either generally as a single-piece body or as a composite body, for one or a plurality of bicycles, from a variety of suitable materials, such as cast concrete, for example, for use either above or below ground level, the stand comprising a body formed or assembled to provide slot means to receive a bicycle wheel and support the bicycle and means to enable locking the bicycle to the stand, the body being further formed to minimize the amount of material required to form the same without reducing its stability and to reduce the possibility of injury from use thereof.

4 Claims, 11 Drawing Figures

BICYCLE STAND

BRIEF SUMMARY OF THE INVENTION

This invention relates to a device or stand for supporting and locking a bicycle, the stand, in certain forms, being adapted for assembly of relatively simple standard components to provide a multiple-bicycle stand and having other advantages over certain prior art devices.

Awareness of physical fitness, air pollution, the energy crisis, inflation and other factors have created a relatively recent substantial increase in the popularity, use, manufacture and sale of bicycles. However, with this upsurge of the numbers of bicycles, there has also been a noticeable increase in the number of instances of tampering with and stealing of bicycles, some of which are relatively expensive. Further, a bicycle should be stored erect in a safe place to prevent the deterioration and potential damage that accompanies indiscriminately lying it on its side anywhere on the ground, as children, in particular, are prone to do.

Many devices, such as racks or stands, have been proposed for supporting and locking one or more bicycles. Most bicycles, for example, are manufactured to provide an integral kickstand, some disadvantages of which are that (1) it is unstable if not extended fully and/or used on a level surface and (2) it damages lawn areas.

Other available stands separate from the bicycle have one or more disadvantages, such as (1) being too expensive to construct and/or maintain, (2) requiring above-the-ground structure that (a) interferes with other uses of the ground area involved and, equally important, (b) is formed in a manner to allow injury to the user, (3) not being adaptable to both above or below ground level installation without modification, (4) not being adapted for assembly from standard components in single or multiple bicycle versions, (5) having low stability-weight ratio, particularly in the single bicycle form and (6) being inconvenient to handle, for example.

Accordingly, a main object of the invention is to provide a bicycle stand device that will overcome one or more of the above-mentioned disadvantages. More specifically, the invention as disclosed and described herein in its various modifications embodies features such as the following:

a. Inexpensive construction, such as cast concrete;
b. Single-piece or composite construction;
c. Single or multiple bicycle structure;
d. Adapted for easy assembly from standard components;
e. Above or below ground level installation;
f. Safer, more stable and less weight; and
g. Convenient to handle.

These and other objects and advantages of the invention will become more apparent upon reference to the specification and the appended drawings.

DETAILED DESCRIPTION

Figure 1:
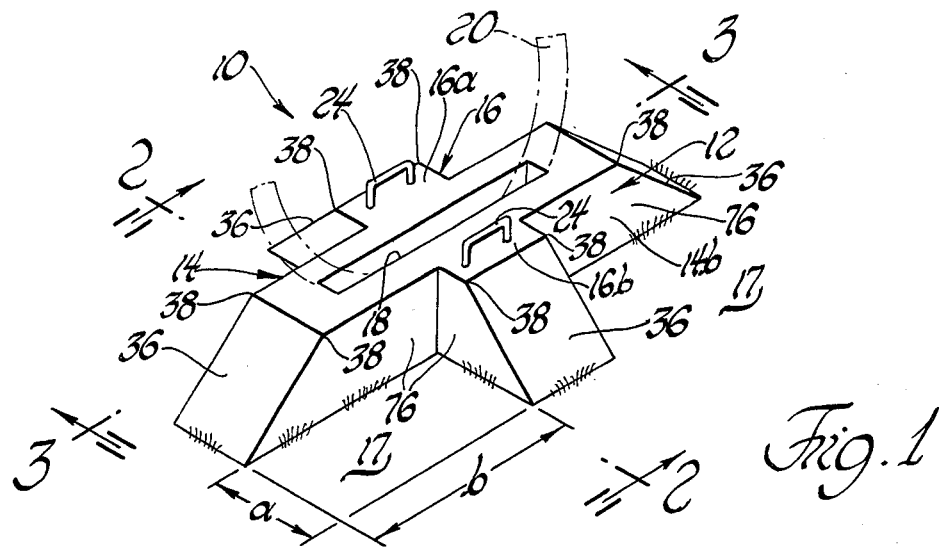
FIG. 1 is a perspective view of a single-bicycle embodiment of the invention.

Referring now to the drawings in greater detail, wherein identical or similar features are identified by identical or similar reference numerals, FIGS. 1–4 illustrate one embodiment of the invention comprising a bicycle stand 10 cast or otherwise generally formed as a single body 12 from concrete. It will be apparent that other similar or suitable materials may be employed.

The body 12 may comprise a symmetrical cross-like member, such as may be considered as comprising intersecting longer and shorter members 14 and 16 so as to provide longer longitudinal legs 14a and 14b and shorter lateral legs 16a and 16b, respectively. As shown, members 14 and 16 intersect at their midpoints, so that the legs 14a and 14b and the legs 16a and 16b are of equal length; however, this is not required.

The cross-like configuration eliminates the corner portions 17, as represented by the arrows "a" and "b" in FIG. 1, so as to eliminate the weight of (and thus the material required to make) a concrete body including these corner portions, without reducing the horizontal stability of the body 12, as compared to a rectangle, "XY", including such corner portions 17.

Figure 2:
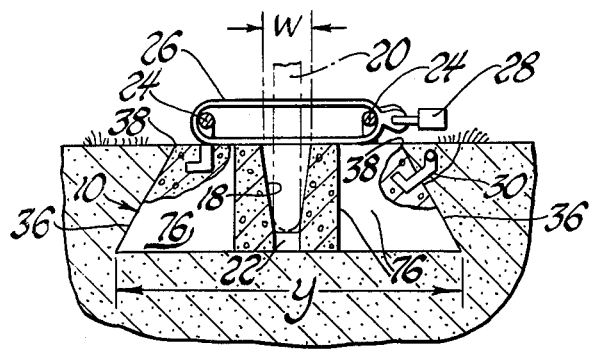
FIGS. 2 and 3 are cross-sectional views, with some portions thereof broken away, taken on the planes of lines 2—2 and 3—3, respectively, of FIG. 1, looking in the direction of the arrows.

A slot or groove 18 is formed in the body 12 from the top thereof, it being noted the slot is disposed longitudinally of the longer member 14, and not the shorter member 16. Also, it will be noted (FIGS. 2 and 3) that the slot 18 may be annular, to fit the annular bicycle wheel 20, or non-annular, as shown by the solid line, and of a width (w), depth (d) and length (l) to receive a sufficient portion of bicycle wheel 20 to adequately support the bicycle (not shown) in an erect position. As shown in FIG. 2, slot 18 may taper slightly, from top to bottom, to guide insertion of the wheel 20, and an opening 22 is preferably provided at the bottom of the slot to allow water and foreign matter to escape therefrom.

It will be further noted that the overall dimension and mass (cost) of the body 12 is generally decreased by forming the wheel-receiving slot 18 in the longer element or member 14, rather than in the shorter member 16, since this allows for desirable maximum reception of the wheel 20 (and thus maximum bicycle stability) for a given depth (d) of the slot. Such construction permits limiting the length of the laterally-extending member 16 to the minimum required to provide lateral stability. Short members 16 can reduce the ground area required in placing individual stands 10 side-by-side in a row. That is, the spacing of a plurality of bicycles supported in a row of individual stands 10 can be determined by bicycle structure, itself, such as width of the handle bars or pedals, rather than unnecessarily long members 16.

Figure 3:
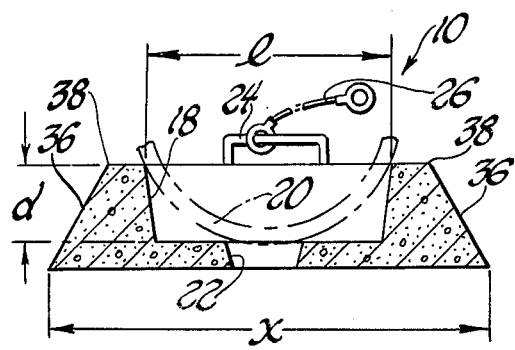

As shown in FIGS. 1–3, the body 12 is provided with eyes 24, (one in each member 16), for reception of a chain or wire rope 26 secured by a lock 28 (FIG. 2) to secure the wheel 20 and/or the bicycle frame to the stand 10. Actually, only one eye 24 may be adequate. Also, as shown, the eyes 24 may be of sufficient length and of a configuration suitable for use as handles to carry the stand.

Figure 4:
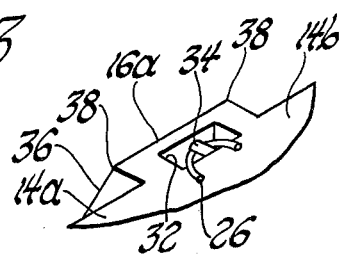
FIG. 4 is a fragmentary perspective view of a portion of FIG. 1, illustrating a modification of the invention.

FIGS. 2 and 4 illustrate means for providing locking means that do not protrude above ground level, as where the device 10 is embedded in grass over which a lawn mower is to be operated. In FIG. 2, a single eye 30 is embedded in the end of member 16b, in a manner so that it does not protrude above the top surface of body 12, in which case eyes 24 would not be employed. In FIG. 4, the top of leg 16a is formed with a recess 32, and a steel rod 34 extends through the recess to retain the wire rope 26.

It will be particularly noted that the ends 36 of members 14 and 16 are sloped outwardly so that the bottoms of members 14 and 16 are longer than the tops thereof. The result of these sloped ends is threefold. First, in a cement device, it reduces the amount of cement required to form the same. Secondly, the sloped ends 36 result in the corners 38 being inside the outermost base periphery of the body 12, thereby substantially eliminating the same as a hazard on which a person whose foot has contacted the end of member 14 and 16 could easily bruise his ankle or leg (as compared to where the ends 36 were vertical) if the stand 10 is used at ground level, as in FIG. 1. Third, the sloped ends 36 cause the body 12 to be more stable or rigid (better anchored) when the device 10 is buried, as shown in FIG. 2. This is because any force tending to lower one side or end of body 12 must raise the fill covering the opposite side or end. As will be explained, it is contemplated that in the preferred structure, the slope of ends 36 is greater than merely that required as a draft angle to withdraw the body 12 from a mold, whether or not body 12 is formed by casting or molding.

FIGS. 5–8 illustrate an embodiment of the invention that may be easily assembled from prefabricated standard parts, as from a do-it-yourself kit, for example. In this embodiment, the stand 40 can comprise two identical body halves 42, from which a stand similar to stand 10 can be constructed. Some of the advantages of stand 40 over stand 10 are that (1) the halves 42 can be assembled with a space therebetween equivalent, in function, to the slot 18 of stand 10, but of a width to accommodate the particular wheel 20 of the bicycle to be supported, (2) it is lighter and thus easier to handle than stand 10 and (3) the mold to produce body halves 42 may be simpler than that to cast body 12, depending upon what structure is included.

It will be noted that the body halves 42 each comprise a longitudinal member 44, which may be generally the same length and height, but less than one-half (due to absence of a slot 18) the width of member 14 of stand 10, and a shorter lateral member 46 similar to leg 16a (or 16b) of stand 10. The ends 36' are preferably sloped to a degree similar to ends 36 of stand 10, and a passage 48 is formed near each end of member 44 to receive a bolt 50.

Figure 6:
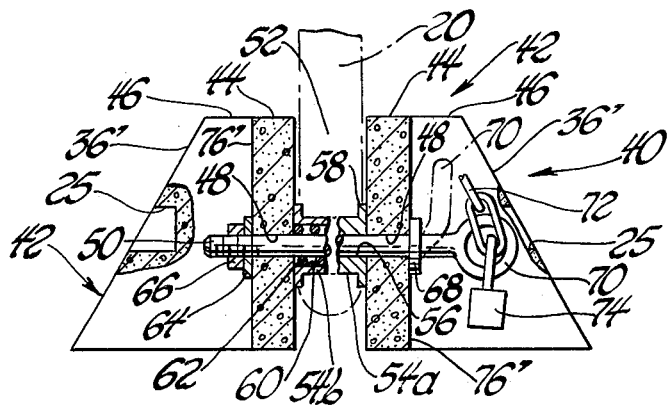
FIGS. 6 and 7 are, respectively, somewhat enlarged and reduced cross-sectional views, taken on the planes of lines 6—6 and 7—7, respectively, of FIG. 5, looking in the direction of the arrows.

In assembly of a pair of body members 42 to provide a stand 40, the width of the space 52, which will vary with the width of the tire 20 to be accommodated, is determined by the length of a tubular spacer sleeve 54, which is shown in FIG. 6 as being of two alternate designs. Spacer 54a (of which half is shown) is formed with a passage 56 to receive bolt 50 and an annular flange 58 at each end to provide more bearing area on the inner surface of member 44 adjacent the passage 48. Spacer 54b, which also has a flange 58 at each end, is formed with a larger diameter passage 60 to receive a compression spring 62, which serves to maintain tension in the assembly 40.

Figure 5:
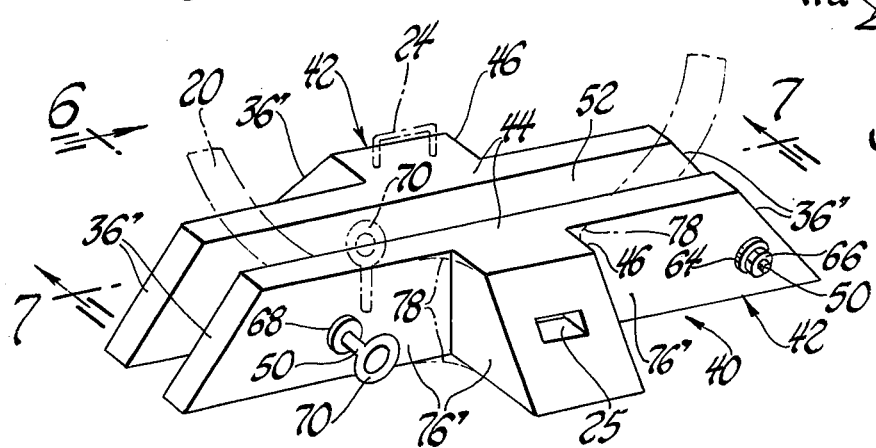
FIG. 5 is another perspective view, similar to FIG. 1, illustrating another single-bicycle embodiment of the invention.

Whatever form of spacer is employed, the bolt 50 is passed therethrough, and a washer 64 and nut 66 assembled and tightened at each end thereof, as shown at the right-hand portion of FIG. 5 and the left side of FIG. 6. This would be the case, for example, if the stand 40 is employed above ground, in which case one or two handle-eyes 24 (shown in broken lines in FIG. 5) may be employed, for purposes already stated. Alternatively, the eyes 24 may be eliminated, and one end of one bolt 50 may be formed with an annular shoulder or flange 68 and an eye 70.

In the event the stand 40 is to be buried, as shown in FIG. 2, the eye 70 may be turned up, as in FIGS. 5 and 6, but terminate below the top surface of member 42, as shown in broken lines in FIG. 6, for the purpose of eye 30 of FIG. 2. A cable or chain 72 and lock 74 may be employed to secure the bicycle wheel or frame to the stand.

In lieu of the eye-handle 24, or in addition thereto, the stands 10 and 40 may be formed, for handle purposes, with one or more indented gripping slots, such as slots 25 shown in FIGS. 5 and 6.

An advantage of stand 40, over stand 10, is that it can be initially assembled with a spacer 54 to accommodate the width of any particular wheel 20 and then subsequently reassembled with a different-length spacer for a different-width wheel, as where the stand is first purchased for supporting a small child's balloon tire bicycle and then later needed for a narrow-tire bicycle the older child, or an adult, may use.

Figure 8:
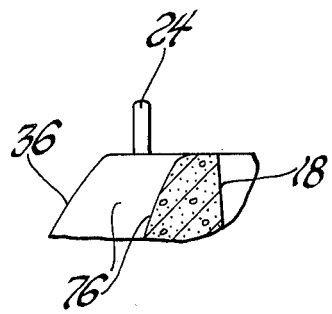
FIG. 8 is an enlarged fragmentary view, similar to a portion of FIG. 2, illustrating a modification of the invention.
Figure 7:
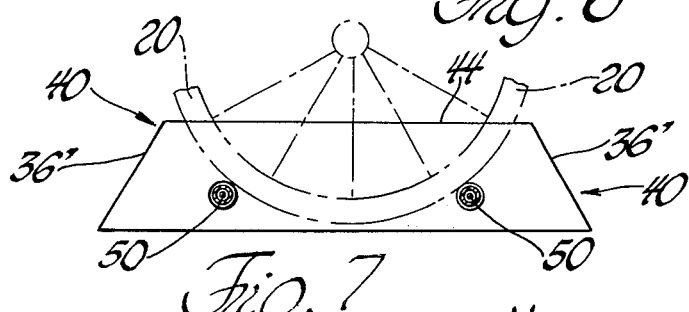

It will be understood that while the peripheral side walls 76 and 76', except for ends 36 and 36', of stands 10 and 40, respectively, are shown as substantially vertical, which would include any slight slope resulting from any draft angle of a mold, any of these walls 76 or 76' may also be substantially sloped to further reduce material, without decreasing stability, as shown in FIG. 8. However, from the standpoint of preventing injury from corners 38, the substantially sloped ends 36 provide substantial relief. The inner corners could be filleted or rounded, as shown at 78 of FIG. 5, if desired to facilitate manufacture.

Another possible advantage of stand 40, where it is of the same general dimensions as stand 10, is that the effective length of wheel-supporting space or slot 52 may be automatically somewhat greater than slot 18 of stand 10, to engage more of the wheel for support thereof, since it extends the entire length and depth of the stand.

Figure 9:
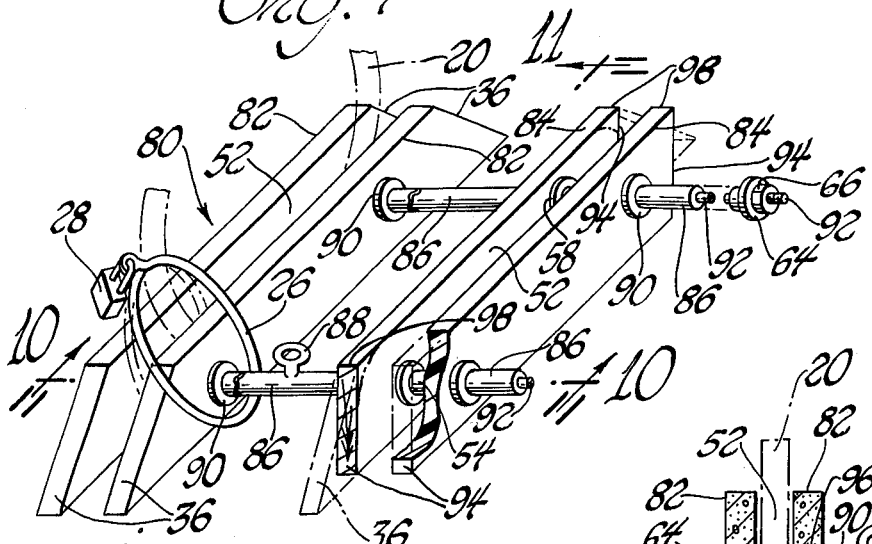
FIG. 9 is still another perspective view, similar to FIGS. 1 and 5, illustrating a multiple-bicycle embodiment of the invention.
Figure 10:
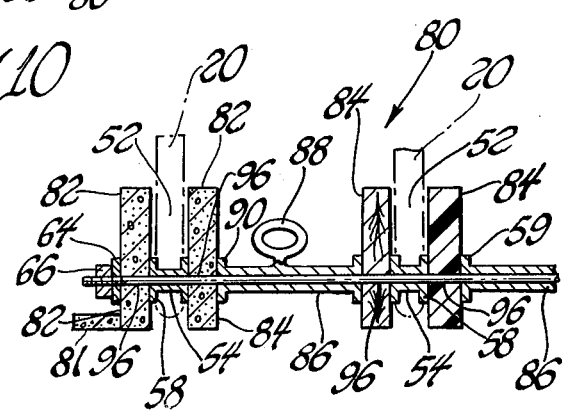
FIGS. 10 and 11 are cross-sectional views taken on the planes of lines 10—10 and 11—11, respectively, of FIG. 9, looking in the direction of the arrows, FIG. 10 illustrating certain modifications of the invention.
Figure 11:
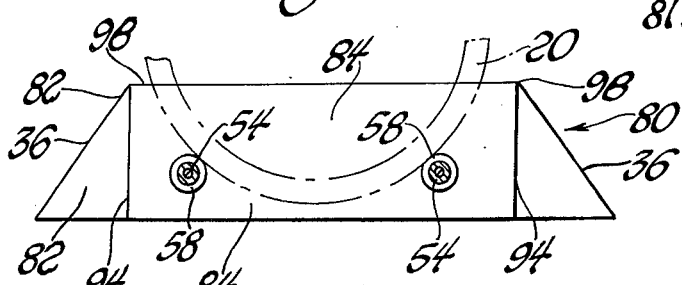

FIGS. 9–11 illustrate a third embodiment of the invention, primarily adapted for assembling, from standard parts or elements, a multi-bicycle stand 80 for any number of bicycles, but containing features common to stands 10 and 40.

To facilitate understanding of the following description, it is considered desirable to explain, generally, that the stand 80 is constructed by appropriate assembly of pairs of spaced elements 82 and/or 84, short spacers 54 (similar to spacer 54a or 54b of FIG. 6, with flanges 58), longer spacers 86 that may be formed with an eye 88 and end flanges 90, bolts 92 (similar to bolts 50, but of any desired length), and washers 64 and nuts 66 similar to those employed in assembly of stand 40.

It will be noted that the elements 82 are shown as being formed from concrete, with sloped ends 36 similar to ends 36 of stand 10, while the elements 84 are shown as formed from wood or a structural plastic material with square ends 94, each element 82 or 84 having bolt passages 96 formed near the ends thereof. Actually, the elements forming stands 10, 40 and 80 may be made from any suitable material. For example, the washers and spacers may also be formed from plastics, although the rods and nuts may best be formed from non-corroding aluminum or plated steel, to prevent rust.

While stand 80 is shown as a multi-bicycle stand, it will be apparent, as represented by the broken lines in spacers 86 in FIG. 9, that a single-bicycle stand 80 may be formed from a single pair of elements 82 or 84, a pair of bolts 92, appropriate washers 64, a pair of spacers 54 having a length to provide a space 52 suitable for the width of the tire 20, and two or four nuts 66, depending upon whether the bolts 92 are threaded at one end (with a head at the other end) or both ends. A single-bicycle stand 80 could be buried, as in FIG. 2, to provide lateral stability. Preferably, members 82 would be employed so that the sloped ends 36 would provide anchoring stability.

In the case of a single-bicycle stand 80, the wire cable or rope 26, secured by lock 28, may encircle one of the spacers 54, at either end of the stand; in a multi-bicycle stand 80, the rope 26 may encircle one of the spacers 54 or 86 or pass through the eye 88, if one is provided. If a sufficiently long cable is employed, it may be used to lock the bicycle frame, rather than the wheel 20, to the stand. Further, the cable or chain 26, with or without a lock, can be permanently secured to the stand at one end, as to an eye 24 of the stand (FIG. 3).

If a multiple-bicycle stand 80 is desired, the assembler need only acquire the necessary pairs of members 82 or 84, longer bolts 92, and an appropriate number of washers 64 and nuts 66, pairs of desired spacers 54 and pairs of longer spacers 88 and then assemble the same as shown and described.

It is apparent that the number of bicycles than can be accommodated in a multi-bicycle stand 80 is, in a sense, dependent only upon the length of bolts or threaded rods 92 available on which to assemble the standard components. Further, the length of the spacers 86 can be varied to provide such variable side-by-side bicycle spacing as may be required due to the width of handle bars or pedals, or the desired space between bicycles. All of the bicycles of a family with five bicycles (for example, two with balloon tires of two different widths and three with narrower tires of three different widths) can be readily custom accommodated, quickly, inexpensively, neatly, efficiently and in a minimum of space, as may be necessary in the case of apartment living.

In the case of a multi-bicycle stand 80, as compared to stands 10 and 40, lateral stability is provided by the length of the stand, as determined by the number of pairs of members 82 and/or 84 (length of bolt) employed. Stability in the other direction is not as critical because the bicycle is supported on spaced wheels 20. However, adequate anchoring of a buried stand and protection against leg injury, as anyone who has scraped an ankle or shin on a hard object will agree, are important. Thus, as shown in FIG. 9, the end pairs of members 82 in a multi-bicycle stand 80 are preferably formed with sloped ends 36, as in the case of stands 10 and 40. Some of the pairs of members 84, intermediate the ends of the stand 80, may have generally square ends 94, and, in an above ground stand, corners 98 may be rounded, as shown by the broken lines. Square ends, rather than sloped ends, on intermediate members 84 may be more acceptable in a buried stand application, since the sloped ends 36 of the end pairs of members 82 may provide adequate anchoring. Obviously, stands 40 and 80 do not require a bottom opening 22, due to the open space 52.

Other general observations concerning the invention are that the bicycle wheel is supported, in stands 40 and 80, by the spacers 54, which are preferably located (FIGS. 7 and 11) nearer the bottom edges of members 44 and members 82 and 84, and the distance therebetween is preferably such that a wheel 20 is vertically supported on the spacers 54 and laterally by the adjacent inner surfaces of members 44, 82 or 84.

Where stand 80 is a multiple-bicycle stand, each outer member 82 may be formed with a laterally-extending portion 81 along the bottom edge thereof, particularly adjacent bolt 92 to keep the leg away therefrom. In the case of a single-bicycle stand, both of the members 82 may be so formed. Or in either case, the outer side of each outer member 82 may be sloped, like side 76 of FIG. 8, with a cavity to receive the end of bolt 92, washer 64 and nut 66.

In plan view, the periphery of the top of the stand body does not extend beyond or overhang the bottom periphery; further, however, the top periphery lies substantially within the bottom periphery of the body at the ends 36, as well as at the sides 76 and 76', or at the sides of the members 82 and/or 84, if they too are sloped, as shown in FIG. 8.

From the above description, it will be apparent that the invention provides a single or multiple-bicycle, separate and single-piece or composite bicycle stand device that may be made of any suitable materials and used above or below ground level, the stand having means for locking the bicycle to the stand and means to decrease the mass of the stand while reducing the possibility of injury in use thereof, without decreasing its stability, as well as providing the other objects and advantages stated herein.

The invention, and the manner of making and using the same, has been described in such full, clear, concise and exact terms as to enable any person skilled in the art to which the invention appertains to make and use the same.

While several embodiments of the invention and modifications thereof have been shown and described, certain changes may be made without departing from the scope of the invention, and no limitations are intended except as stated in the claims.

What I claim as my invention is:

1. A bicycle stand, comprising a three-dimensional main body having length, width and height to provide a flat top, a flat bottom parallel to said top and oppositely-disposed flat sides and ends between said top and bottom, said sides and ends defining the periphery of said body, said body being adapted to be used either above ground level or buried below ground level and formed with a slot opening at least at said top, said slot being of a length, width and depth to receive a bicycle wheel in a manner to support the bicycle in its upright position, the lengths of said body and said slot being aligned, at right angles to said width of said body, said body being formed with means to (a) reduce the amount of material required to form the same, without decreasing the horizontal stability thereof, (b) improve anchoring of said body when buried and (c) reduce as a hazard certain upper edges and corners of said body on which leg injury to the user could occur when said stand is used above ground level and the user's foot is positioned closely adjacent certain pheripheral portions of said body, at or near said bottom periphery, said means comprising at least one of said ends and sides above said bottom periphery being formed so as to be disposed substantially inwardly from said bottom periphery, so that, in the top plan view of said body, not only does no portion of said ends and sides of said body lie outside said bottom periphery, but also said ends and sides lie entirely within said bottom periphery of said body, said body comprising a pair of substantially identical elongated body halves fixedly secured in aligned, spaced relation so as to provide said bicycle wheel-receiving slot therebetween extending along said length of said body, each of said body halves being formed with a passage extending transversely therethrough adjacent each end thereof and said stand further comprising a spacer with a passage therethrough disposed between said halves at said ends thereof adjacent and aligned with said passages in said body halves and a connecting member extending through each of said aligned passages and spacers, the distance between said spacers being less than the diameter of the bicycle wheel, whereby the bicycle wheel can be supported vertically by said spacers, between said body halves.

2. A bicycle stand such as that recited in claim 1, wherein said passages formed near the ends of said body halves are disposed nearer the bottom edges thereof, whereby said wheel-supporting spacers are also disposed nearer said bottom edges.

3. A bicycle stand such as that recited in claim 1, wherein said body is per se formed handle means to carry said stand.

4. A bicycle stand such as that recited in claim 3, wherein comprises a slot or cavity formed in said body, as in at least one of said sides or ends.

* * * * *